H. F. & G. F. SHAW.
Side-Hill Plow.

No. 200,413.                Patented Feb. 19, 1878.

Attest;
H. W. Bricher.
H. E. Bathrick.

Inventors;
Henry F. Shaw,
George F. Shaw,
per Edw. Dummer, Atty.

UNITED STATES PATENT OFFICE.

HENRY F. SHAW AND GEORGE F. SHAW, OF BOSTON, MASSACHUSETTS.

IMPROVEMENT IN SIDE-HILL PLOWS.

Specification forming part of Letters Patent No. 200,413, dated February 19, 1878; application filed December 29, 1877.

*To all whom it may concern:*

Be it known that we, HENRY F. SHAW and GEORGE F. SHAW, both of Boston, in the county of Suffolk and State of Massachusetts, have invented a new and useful Improvement in Side-Hill Plows, which improvement is fully set forth in the following specification, reference being had to the accompanying drawings.

Our invention relates to that class of side-hill plows in which the mold-board or mold-boards are changed from one side of the beam to the other by being swung about a line in or approaching a direction longitudinal with the beam.

Our invention consists, first, in the form of the mold-boards, the same being united and formed in one piece, the forward portion of which presents a surface of one curvature suited to that portion of both mold-boards, and the rear portion presenting two diverging concave surfaces, each one suitably formed to give the best working shape to its own mold-board.

The two mold-boards being so closely united and formed in one piece, we shall hereinafter speak of them both as one mold-board.

Our invention further consists in the method of pivoting and hanging the mold-board, wherein a connecting-link is used at the rear, one end of which is pivoted to the beam or body of the plow and the other to the mold-board, so that as the latter passes under the beam it is nearly or quite parallel with the beam.

Figure 1:
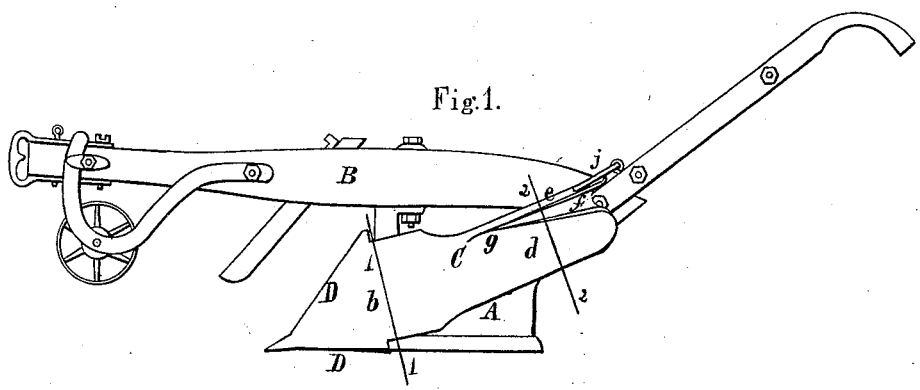
Figures 2, 5, 6:
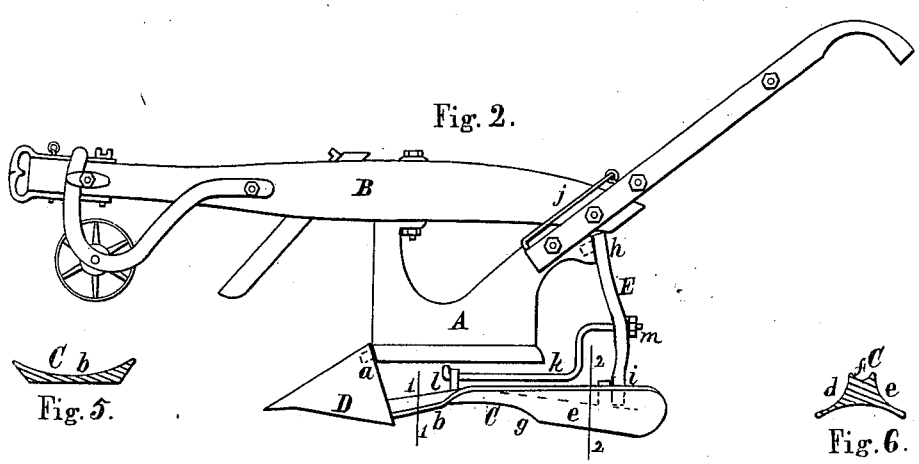
Figure 3:
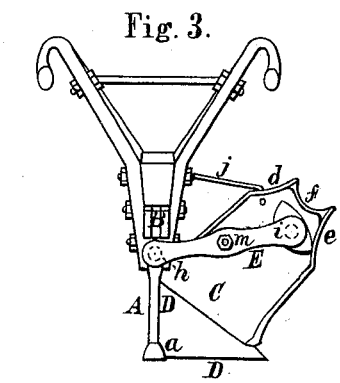
Figure 4:
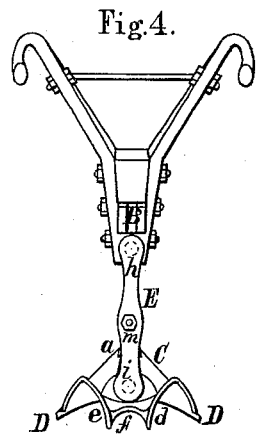

In the drawings, Figure 1 is a side view of a plow embodying our invention. Fig. 2 is a side view, but showing the mold-board swung directly under the beam in changing the same from working position on one side to that on the other. Fig. 3 is a rear view, the mold-board being on the other side from that as shown in Fig. 1. Fig. 4 is a rear view, showing the mold-board in the position in Fig. 2. Fig. 5 is a section of mold-board taken on line 1 1 of Figs. 1 and 2. Fig. 6 is a section of mold-board taken on line 2 2 in Figs. 1 and 2.

The thin piece A, which forms the land-side of the plow, working on either side, is attached rigidly to the beam B, the latter being of the ordinary construction. The mold-board C is pivoted, as to its forward part, to the piece A at $a$.

The shares D are formed to work vertically or horizontally, as the mold-board is on one side or the other of the beam, and as is common in this class of plows; but the shape of our mold-board is of a peculiar and novel construction.

The forward part $b$ is not only made to give the best shape to its working-surface, but this shape, which is both concave and spiral, is carried through the whole length of the mold-board. In order to do this, we form at the rear portion two diverging concave spiral surfaces, $d$ and $e$. We are thus able to give a twist to each of the wings $d$ and $e$ of the mold-board, spiral to that degree that the upper edge of each working wing shall project farther from the beam than the lower edge, as shown.

We have found and here show that the two diverging portions $d$ and $e$ can be made to unite in the part $b$, so as to give the above-named desirable shape to the mold-board through its whole length when working from either side. In other words, in using these two diverging concave surfaces $d$ and $e$ for the rear portion of the mold-board, which blend into the forward portion, as shown, we are able to give to the surface of the mold-board for either side the shape of the best formed mold-boards used in land-side plows.

The part $f$ of the mold-board, between the edges of the working portions, may be of such form as is most desirable for strength, &c. The point $g$, where the edges unite, is intended to be sufficiently high that no earth will pass above it.

We find it desirable, and by the form of our mold-board we are able, to have a long mold-board to turn the furrow in the best manner, as with land-slide plows; and in order that a long mold-board may be swung under the beam easily, and the rear portion thereof not project downward, we hang the mold-board as follows: E is a connecting-link, which is pivoted to the beam or body of the plow at $h$, and at the other end to the mold-board at $i$. When so pivoted and hung, the mold-board, being also pivoted at $a$, will be nearly or quite parallel with the beam when passing under it, and will be brought to its proper position on either side, where it is held by the rod and hook $j$, as shown. The mold-board and link E are held in place by the rod $k$, which hooks in the eye-piece $l$ attached to the mold-board, and passes through the link E, where it receives the nut $m$.

We claim as our invention—

1. A side-hill plow having a mold-board formed in one piece, so that the rear portion presents two diverging concave surfaces, and hung, as to its rear end, by means of a link, E, pivoted at $h$ and $i$, substantially as hereinbefore described.

2. The mold-board C, pivoted at $a$, and attached, as to its rear end, to the body of the plow by means of the link E, pivoted at $h$ and $i$, substantially as and for the purpose hereinbefore set forth.

HENRY F. SHAW.
GEORGE F. SHAW.

Witnesses:
 EDW. DUMMER,
 WILLIAM S. LOCKE.